United States Patent
Liebig

[19]

[11] Patent Number: 6,018,942
[45] Date of Patent: Feb. 1, 2000

[54] COMBINED CYCLE POWER STATION WITH GAS TURBINE COOLING AIR COOLER

[75] Inventor: Erhard Liebig, Ditzingen, Germany

[73] Assignee: Asea Brown Boveri AG, Baden, Switzerland

[21] Appl. No.: 08/955,607

[22] Filed: Oct. 22, 1997

[30] Foreign Application Priority Data

Nov. 4, 1996 [DE] Germany .......................... 196 45 322

[51] Int. Cl.[7] ..................................................... F02C 6/18
[52] U.S. Cl. ...................................... 60/39.182; 60/39.75
[58] Field of Search .............................. 60/39.182, 39.75; 415/114

[56] References Cited

U.S. PATENT DOCUMENTS

| 5,404,708 | 4/1995 | Sigling et al. . |
| 5,491,971 | 2/1996 | Tomlinson et al. .................. 60/39.182 |

FOREIGN PATENT DOCUMENTS

| 0515911A1 | 12/1992 | European Pat. Off. . |
| 0709561A1 | 5/1996 | European Pat. Off. . |
| 4409567A1 | 9/1995 | Germany . |
| 4427987A1 | 2/1996 | Germany . |
| WO95/09300 | 4/1995 | WIPO . |

*Primary Examiner*—Louis J. Casaregola
*Attorney, Agent, or Firm*—Burns, Doane, Swecker & Mathis, L.L.P.

[57] ABSTRACT

In a combined power station installation with a gas turbine (4) and a steam turbine (9–11), the exhaust gases from the gas turbine give up their residual heat to the steam turbine via the working medium flowing in a waste heat boiler (7). The waste heat boiler consists essentially of an economizer (21), an evaporator (22) and a superheater (23). A cooling air cooler (32, 33) designed as a once-through steam generator is connected on the water side to the economizer (21) of the waste heat boiler (7). The waste heat boiler is a once-through steam generator in which a separation bottle (25) is arranged on the steam side between the evaporator (22) and the superheater (23). The cooling air cooler (32, 33) is connected on the steam side to the separation bottle (25).

3 Claims, 1 Drawing Sheet

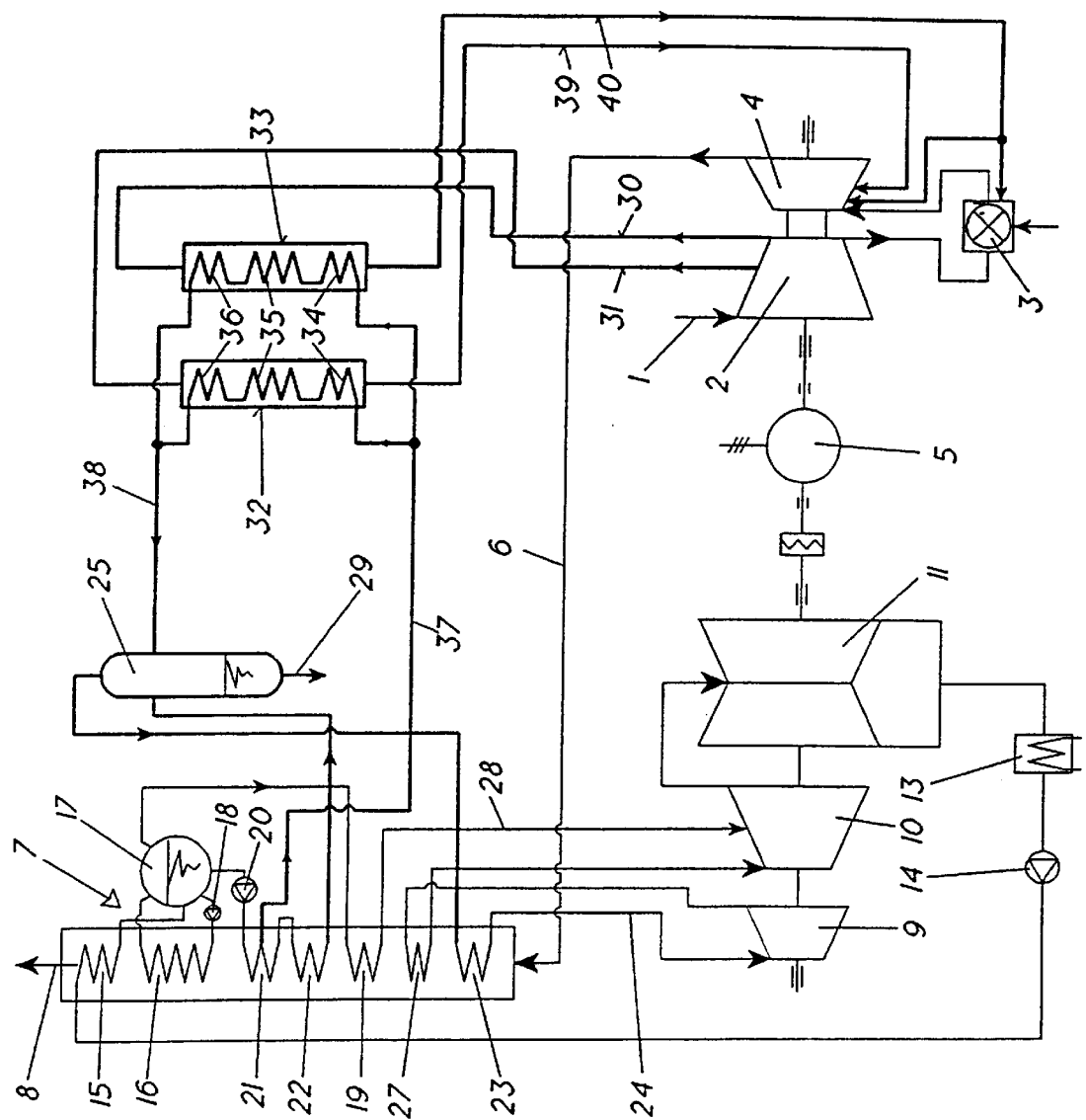

COMBINED CYCLE POWER STATION WITH GAS TURBINE COOLING AIR COOLER

BACKGROUND OF THE INVENTION

1. Field of the Invention

The invention relates to a combined power station installation with a gas turbine and a steam turbine, in which the exhaust gases from the gas turbine give up their residual heat to the steam turbine via the working medium flowing in a waste heat boiler, whereby the waste heat boiler consists essentially of an economizer, an evaporator and a superheater and whereby at least one cooling air cooler is provided which is designed as a forced circulation steam generator and is connected on the water side to the economizer of the waste heat boiler.

2. Discussion of Background

Gas turbines of the modern generation and the higher power class operate with very high turbine inlet temperatures, which makes cooling of the combustion chambers, the rotors and the blading unavoidable. For this purpose, highly compressed air is generally extracted at the compressor outlet and, if appropriate, from a lower pressure stage. Because a very high proportion of the compressed air is consumed for the currently conventional premixed combustion, there remains—on the one hand—only a minimum of cooling air for cooling purposes. On the other hand, this air intended for cooling is already very hot because of the compression so that it is desirable that it should be previously cooled. Cooling by means of water injection ("gas quenching") is known for this purpose; in this method, however, the high-quality heat of the cooling air, whose proportion can amount to as much as 20 MW in current machines, is only partially utilized. In consequence, the use of forced circulation steam generators as coolers for recooling seems appropriate, particularly if the gas turbine operates in a combined gas/steam turbine process with waste heat steam generation.

Such a once-through steam generator for cooling highly compressed air of the type mentioned at the beginning is known, in association with a combined gas/steam turbine process, from EP-A-709 561. In this specification, a partial flow of the boiler feed water is extracted either upstream or downstream of the economizer and, after further preheating, evaporation and superheating in the cooler, is fed back into the high pressure superheater of the waste heat boiler. This boiler is designed as a circulating system boiler with drums. In order to avoid the penetration of moisture or water into the steam turbine when the cooler is run wet, the heated water or wet steam is fed into a blow-down tank until the cooler is dry or until defined conditions are stably present at the cooler outlet, for example hot steam with a few degrees Kelvin superheat or wet steam with a humidity of a few percent. In addition to the water losses, this has the consequent disadvantage of a corresponding monitoring and control system.

SUMMARY OF THE INVENTION

Accordingly, one object of the invention is to provide a novel combined power station installation, of the type mentioned at the beginning, by means of which it is possible to deal without difficulty with the mutually differing system behaviors of a gas turbine cooling air cooler and a waste heat boiler. In accordance with the invention, this is achieved by the waste heat boiler being a forced circulation steam generator in which a separation bottle is arranged on the steam side between the evaporator and the superheater, and the cooling air cooler being connected on the steam side to the separation bottle.

When such an apparatus is used in a combined process, the advantage may be seen inter alia in that high-quality heat is fully retained within the process. Combining different steam parameters—which are the result of the waste heat boiler, on the one hand, and of the gas turbine cooling air cooler, on the other—in the separation bottle can be carried out in the simplest manner without separate receptacles being necessary for this purpose. This advantage becomes more important in the presence of a plurality of parallel-connected coolers which operate at different pressure levels on the air side and produce steam of differing temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein an embodiment example of the invention is presented schematically using a combined gas/steam power station installation.

DESCRIPTION OF THE PREFERRED EMBODIMENTS

Referring now to the individual figure in the drawing, where only the elements essential to the understanding of the invention are shown and where the flow direction of the working media is indicated by arrows, fresh air induced in the gas turbine system via a line 1 is compressed in a compressor 2 to the working pressure. The compressed air is greatly heated in a combustion chamber 3 which is fired, for example, by natural gas and the combustion gas arising in this manner is expanded in a gas turbine 4 with the output of power. The energy thus gained is supplied to a generator 5 and to the compressor 2. The gas turbine exhaust gas, which is still hot, is fed via a line 6 from the outlet of the gas turbine to a waste heat steam generation installation 7 and is led from there, after giving up its heat, via a line 8 and a chimney (not shown) to the open air.

In the water/steam cycle, a multi-cylinder steam turbine 9, 10 and 11 is arranged on the same shaft as the gas turbine. The working steam expanded in the low pressure turbine 11 condenses in a condenser 13. The condensate is delivered, by means of a condensate pump 14, directly into the steam generator 7. A notable feature is that the installation has no low-pressure economizer (usually heated by extracted steam), no feed water tank and no high-pressure economizer.

The waste heat steam generator installation 7 is designed as an upright boiler and operates, in the present case, in accordance with a two-pressure steam process. A horizontal boiler could also, of course, find application.

The low-pressure system is designed as a circulating system with drum, a forced circulation system having been selected in the present case. In the combustion gas path of the boiler, it consists of a low-pressure economizer 15, into which the condensate is introduced, a low-pressure evaporator 16 and a low-pressure superheater 19. The low-pressure evaporator is connected via a circulating pump 18 to a drum 17. The superheated steam is transferred via a low-pressure steam line 28 to an appropriate stage of the medium-pressure steam turbine 10.

The high-pressure system is laid out as a once-through system and can, therefore, be designed for both sub-critical and super-critical parameters. In the combustion gas path of the boiler, it consists essentially of the high-pressure economizer 21, the high-pressure evaporator 22 and the high-pressure superheater 23. The working medium is supplied to the high-pressure economizer 21 from the low-pressure drum 17 via a high-pressure feed pump 20. This permits the omission of the previously usual feed water tank. The superheated steam is transferred to the high-pressure part 9 of the steam turbine via a live steam line 24.

A separation bottle 25, into which the outlet from the high-pressure evaporator 22 enters, is provided for phase separation. The separation bottle is connected, at its upper end, to the high-pressure superheater 23. It is provided with a sludge removal line 29 at its lower end.

After the partial expansion in the high-pressure part 9 of the turbine, the steam is reheated before being transferred to the medium-pressure turbine 10. This reheating takes place, in the illustrative example, in heat exchange surfaces 27 which are arranged in the combustion gas path of the steam generator above the high-pressure superheater 23.

Given such a steam generator, a wide range of combined processes can be covered by variation of the pressures and mass flows in the circulation system and in the through-flow system.

Steam production begins in the boiler with the attainment of the respective boiling temperatures. The first steam in the low-pressure system can be generated by expanding recirculated high-pressure saturated water (not shown) from the separation bottle.

This separation bottle ensures that the high-pressure superheater remains dry at all times and that superheated steam is available early at the boiler outlet. As soon as the pressure necessary for stable operation is reached in the high-pressure evaporator, the live steam can be used to start the steam turbine in sliding pressure operation.

Air lines 30, 31 for air used for cooling purposes branch off from an intermediate location and from the outlet of the compressor 2 and each lead to a cooler 32 or 33. From their air outlet connections, the cooled air flows via cooling lines 39, 40 to the various consumption units. On the water side, these partial flow coolers are connected by the water line 37 to the high pressure economizer 21 of the waste heat steam generator installation 7. In order to prevent two-phase flow in the supply lines, this tapping on the high-pressure economizer 21 is selected in such a way that undercooled conditions are present at the inlet to the cooler in each case. It is obvious that separate water-side feeds to the two coolers shown are also possible.

The coolers 32, 33 are designed as classical once-through steam generators, each with an economizer 34, an evaporator 35 and a superheater 36. They have a vertical arrangement, the evaporation being carried out from the bottom to the top. This provides the possibility of feed water recirculation. In addition, simple water level control and feed control can be employed.

The steam generated in the two coolers is combined and fed via a steam line 38 into the separation bottle 25 of the waste heat boiler. Defined pressure relationships in the corresponding installation parts are produced by means of this separation bottle 25. Even in the case of maximum pressures, no water penetrations in the direction of the steam turbine are to be feared. It is obvious that separate steam lines can also be led into the separation bottle 25 of the waste heat boiler.

The coolers are connected in parallel to one another and to the waste heat boiler, which leads to substantially equal system behavior. In addition, the same water chemistry is present in all parts of the installation. It is worth mentioning that when the installation is being started, no steam blow-down over the roof or the introduction of hot water into a blow-down tank is necessary.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Line (induced fresh air)
2 Compressor
3 Combustion chamber
4 Gas turbine
5 Generator
6 Line (exhaust gas)
7 Waste heat steam generator installation
8 Line (to chimney)
9 High-pressure turbine
10 Medium-pressure turbine
11 Low-pressure turbine
13 Condenser
14 Condensate pump
15 Low-pressure economizer
16 Low-pressure evaporator
17 Low-pressure drum
18 Circulating pump
19 Low-pressure superheater
20 Feed water pump
21 High-pressure economizer
22 High-pressure evaporator
23 High-pressure superheater
24 Live steam line
25 Separation vessel
27 Reheater
28 Low-pressure steam line
29 Sludge removal line
30, 31 Air line
32, 33 Air cooler
34 Economizer
35 Evaporator
36 Superheater
37 Water line
38 Steam line
39, 40 Cooling lines

What is claimed as new and desired to be secured by Letters Patent of the United States is:

1. A combined power station installation with an air cooled gas turbine and a steam turbine, in which the exhaust gases from the gas turbine give up their residual heat to the steam turbine via the working medium flow of a water/steam cycle in a waste heat boiler, whereby the waste heat boiler comprises an economizer, an evaporator and a superheater, and whereby at least one cooler for cooling the gas-turbine cooling air is provided which is designed as a once-through steam generator comprising an economizer, an evaporator, and a superheater and which is fed with water from the economizer of the waste heat boiler, wherein
the waste heat boiler in its high pressure part is a once-through steam generator with a separation bottle which is arranged between the steam outlet of the evaporator of the waste heat boiler and the steam inlet of the superheater of the waste heat boiler, and the steam outlet of the cooler is connected to the separation bottle.

2. The installation as claimed in claim 1, wherein a plurality of coolers, each with a different pressure level of the cooling air, are connected in parallel and being fed with water from a common line and being discharged with steam into a common line.

3. The installation as claimed in claim 1, where the at least one cooler is arranged vertically, the evaporation being carried out from the bottom to the top.

* * * * *